(12) United States Patent
Stoev et al.

(10) Patent No.: US 7,443,632 B1
(45) Date of Patent: Oct. 28, 2008

(54) MAGNETIC HEAD WITH STITCHED TOP POLE LAYER AND SINGLE LAYER COIL OR SOLENOIDAL COIL

(75) Inventors: Kroum S. Stoev, Pleasanton, CA (US); Francis H. Liu, Fremont, CA (US); Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/780,110

(22) Filed: Jul. 19, 2007

Related U.S. Application Data (62) Division of application No. 10/770,992, filed on Feb. 2, 2004, now Pat. No. 7,248,433.

(51) Int. Cl.
*G11B 5/127* (2006.01)
*G11B 5/147* (2006.01)

(52) U.S. Cl. .......................... 360/123.05; 360/123.06; 360/125.04; 360/125.06

(58) Field of Classification Search ................. 360/123, 360/126, 123.05–123.08, 123.1, 123.2, 123.21, 360/123.41, 123.42, 123.11, 123.18, 123.19, 360/123.38, 123.4, 123.61, 125.01, 125.04, 360/125.06
See application file for complete search history.

(56) References Cited

U.S. PATENT DOCUMENTS

| | | | | |
|---|---|---|---|---|
| 4,713,711 A | * | 12/1987 | Jones, Jr. et al. | ............. 360/123 |
| 4,985,985 A | * | 1/1991 | Das | ........................ 29/603.14 |
| 5,428,887 A | * | 7/1995 | Mallary | ................... 29/603.08 |
| 5,703,740 A | * | 12/1997 | Cohen et al. | ................ 360/126 |
| 5,995,342 A | | 11/1999 | Cohen et al. | |
| 6,029,339 A | | 2/2000 | Chang et al. | |
| 6,185,068 B1 | * | 2/2001 | Fujita et al. | .................. 360/123 |
| 6,195,232 B1 | * | 2/2001 | Cohen | .................... 360/123.38 |
| 6,236,538 B1 | * | 5/2001 | Yamada et al. | ............... 360/126 |
| 6,246,541 B1 | * | 6/2001 | Furuichi et al. | ............... 360/123 |
| 6,275,354 B1 | * | 8/2001 | Huai et al. | ............... 360/123.61 |
| 6,278,591 B1 | | 8/2001 | Chang et al. | |
| 6,317,290 B1 | | 11/2001 | Wang et al. | |
| 6,329,211 B1 | * | 12/2001 | Terunuma et al. | ............... 438/3 |
| 6,525,901 B1 | * | 2/2003 | Kamijima et al. | ............ 360/123 |
| 6,650,503 B1 | | 11/2003 | Chen et al. | |
| 6,721,138 B1 | | 4/2004 | Chen et al. | |
| 6,729,012 B1 | * | 5/2004 | Sasaki | ...................... 29/603.07 |
| 6,737,281 B1 | | 5/2004 | Dang et al. | |
| 6,757,134 B2 | | 6/2004 | Emilio Santini | |

(Continued)

*Primary Examiner*—Brian E Miller
(74) *Attorney, Agent, or Firm*—Jonathan E. Prejean, Esq.; Strategic Patent Group (57) ABSTRACT

A magnetic head is disclosed that has first and second substantially flat soft magnetic pole layers that are magnetically coupled together in a backgap region that is removed from the medium-facing surface; a soft magnetic pedestal having a leading edge and a trailing edge, the trailing edge adjoining the second pole layer adjacent to the medium-facing surface, the leading edge defining a throat area that is spaced from the first pole layer by a submicron nonferromagnetic gap and defining an apex area that is spaced from the first pole layer by a greater separation than the gap, the throat area meeting the apex area at a throat height; and a plurality of substantially parallel, electrically conductive sections disposed between the first and second pole layers, the conductive sections disposed in a single layer that is aligned along a plane that intersects the pedestal and the backgap region.

8 Claims, 5 Drawing Sheets

U.S. PATENT DOCUMENTS

| | | | |
|---|---|---|---|
| 6,778,354 B2 * | 8/2004 | Matono | 360/123.39 |
| 6,826,015 B2 | 11/2004 | Chen et al. | |
| 6,927,939 B2 * | 8/2005 | Sasaki et al. | 360/125.67 |
| 6,940,688 B2 * | 9/2005 | Jiang et al. | 360/125.43 |
| 6,980,396 B2 * | 12/2005 | Kasajima et al. | 360/123.4 |
| 7,072,142 B2 * | 7/2006 | Lam | 360/123.19 |
| 7,130,153 B2 | 10/2006 | Shen et al. | |
| 7,145,750 B2 * | 12/2006 | Kimura et al. | 360/125.04 |
| 7,209,322 B2 * | 4/2007 | Sato | 360/126 |
| 2002/0039254 A1 * | 4/2002 | Taguchi et al. | 360/125 |
| 2002/0191350 A1 | 12/2002 | Santini | |
| 2003/0030943 A1 | 2/2003 | Han et al. | |
| 2003/0202278 A1 | 10/2003 | Chen et al. | |
| 2004/0042119 A1 * | 3/2004 | Kasajima et al. | 360/126 |
| 2004/0070871 A1 * | 4/2004 | Ogawa et al. | 360/126 |
| 2004/0085684 A1 * | 5/2004 | Basra et al. | 360/317 |
| 2005/0207061 A1 * | 9/2005 | Mochizuki et al. | 360/123 |

\* cited by examiner

MAGNETIC HEAD WITH STITCHED TOP POLE LAYER AND SINGLE LAYER COIL OR SOLENOIDAL COIL

CROSS-REFERENCE TO RELATED APPLICATIONS

This application is a divisional of U.S. patent application Ser. No. 10/770,992, filed on Feb. 2, 2004, incorporated by reference in its entirety.

BACKGROUND

The present invention relates to inductive magnetic transducers, which may for example be employed in information storage systems or measurement and testing systems.

Inductive heads used for writing and/or reading magnetic information on storage media such as a disk or tape typically include electrically conductive coil windings encircled by a magnetic core including first and second pole layers. Portions of the pole layers adjacent the media are termed pole tips. The magnetic core is interrupted by a submicron nonmagnetic gap disposed between the pole tips to divert magnetic flux to the media during writing. To write to the media electric current is flowed through the coil, which produces magnetic flux in the core encircling the coil windings, the magnetic flux fringing across the nonmagnetic gap adjacent to the media so as to write bits of magnetic field information in tracks on the media.

The first pole layer may also serve as a magnetic shield layer for a magnetoresistive (MR) sensor that has been formed prior to the pole layers, the combined MR and inductive transducers termed a merged or piggyback head. Typically the first pole layer is substantially flat and the second pole layer is curved, as a part of the second pole layer is formed over the coil windings and insulation disposed between the pole layers, while another part nearly adjoins the first pole layer adjacent the gap. The second pole layer may also diverge from a flat plane by curving to meet the first pole layer in a region distal to the media-facing surface, sometimes termed the back gap region, although typically a nonmagnetic gap in the core does not exist at this location.

The curvature of the second pole layer from planar affects the performance of the head. An important parameter of the head is the throat height, which is the distance from the media-facing surface to where the first and second pole layers begin to diverge and become separated by more than the submicron nonmagnetic gap. Because less magnetic flux crosses the gap as the pole layers are further separated, a short throat height is desirable in obtaining a fringing field for writing to the media that is a significant fraction of the total flux crossing the gap.

In addition to the second pole layer being curved from planar, one or both pole layers may also have a tapered width in the pole tip area, to funnel flux through the pole tips. A place where the second pole layer begins to widen is sometimes termed a nose or flare point. The distance to the flare point from the media-facing surface, sometimes called the nose length, also affects the magnitude of the magnetic field produced to write information on the recording medium, due to decay of the magnetic flux as it travels down the length of the narrow second pole tip. Thus, shortening the distance of the flare point from the media-facing surface would also increase the flux reaching the recording media.

Unfortunately, the aforementioned design parameters require a tradeoff in the fabrication of the second pole tip. The second pole tip should be narrow and well-defined in order to produce narrow and well-defined written tracks on the rotating disk, but the slope of the second pole layer at the end of the throat height makes photolithography difficult. The second pole layer can be formed in two pieces to better define the pole tip; a flat pole tip layer and a curved yoke layer that are connected or stitched together. This solution, however, can actually require the throat height to be extended in order to have a sufficient stitched area for flux transfer between the second pole tip and the yoke. High-resolution photolithography, such as I-line or deep ultra violet (DUV) photolithography, may be useful for reducing feature sizes but has a more limited depth of focus that may exacerbate the problem of focusing on the sloped pole layer adjacent the throat.

In addition, several methods are known to form self aligned pole tips. In one method, an ion beam etch (IBE) or other highly anisotropic process removes a portion of the second pole layer not protected by a mask, thereby creating the second pole tip, with the etching continued to similarly remove a portion of the first pole tip not covered by the second pole tip. The width of the pole tip layers are therefore matched, and walls of the pole tips are aligned, but the problem of accurately defining the second pole tip by photolithography for a short throat height remains. Other proposals include forming an electrically conductive gap layer, so that the second pole tip can be electroplated atop the first. A second pole tip directly plated on a conductive gap layer may have increased eddy currents that counteract high-frequency operation, however, and so has not been widely employed.

High-frequency operation may also be counteracted by self-inductance of the coil that is used to drive the magnetic flux. The number of coil turns may be reduced to reduce the self-inductance, but this generally results in reduced electromotive force. Larger coil cross-sections may be employed, but at high frequencies a skin effect-may arise that limits electric current to the surface of the coil cross-sections. Other coil configurations can be employed but typically involve manufacturing difficulties.

Figure 1:
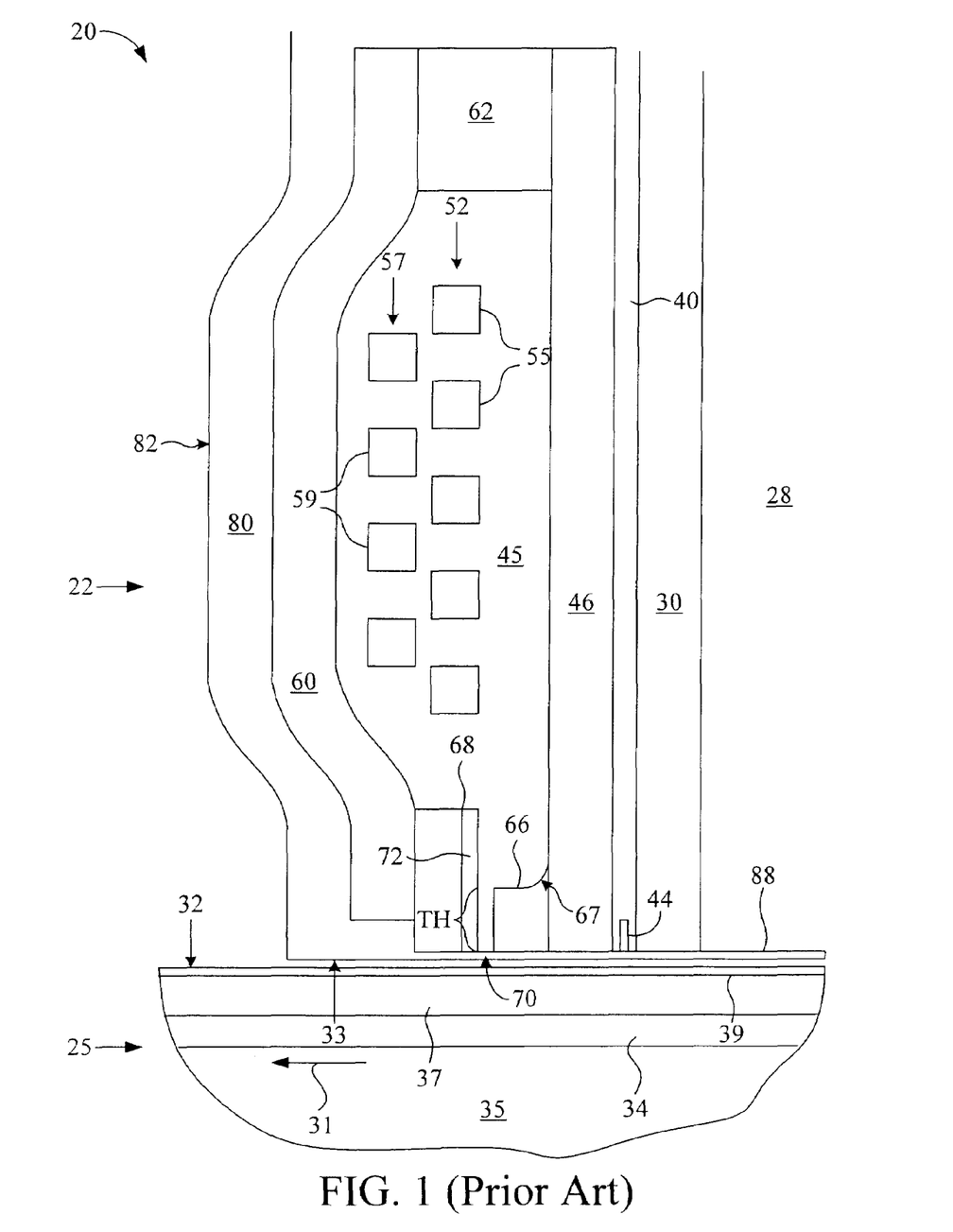
FIG. 1 is a cutaway cross-sectional view of a Prior Art magnetic head in proximity to a relatively moving medium, the head including a leading pedestal adjoining a write gap and defining a throat height.

FIG. 1 is a cutaway cross-sectional representation of an information storage system 20 that is disclosed in U.S. patent application Ser. No. 09/999,694, filed Oct. 24, 2001, which is owned by the assignee of the current application and is incorporated by reference herein. A magnetic head similar to that shown in FIG. 1 has been commercially available for at least one year prior to the filing of the present application. A portion of an electromagnetic head including a merged inductive and MR transducer 22 is depicted in close proximity to a relatively moving media such as a spinning disk 25. The transducer 22 has been formed in a plurality of adjoining solid layers on a wafer substrate 28 that may remain affixed to the transducer 22. A media-facing surface 33 of the solid body that includes the transducer 22 may be formed with a desired relief for fluid and solid interaction with the disk 25, and the body may be termed a head or slider.

The disk 25 may be conventional and includes a self-supporting substrate 35, an underlayer 34, a media layer 37 and a protective overcoat 39. The disk 25 is spinning in a direction indicated by arrow 31 and has a surface 32 adjacent the media-facing surface 33 of the head.

Atop the slider substrate 28 a first low-coercivity, high-permeability or "soft magnetic" shield layer 30 has been formed, for example of Permalloy ($Nio_{.3}Feo_{.2}$) either directly or atop a seed layer, not shown. A first layer of nonmagnetic, electrically insulating material has been formed on the shield layer, followed by a magnetoresistive (MR) sensor 44. The MR sensor can be any sensor that utilizes a change in resistance associated with a change in magnetic field to sense that field, which may be measured as a change in current or voltage across the sensor, including anisotropic magnetoresistive (AMR) sensors, spin-valve (SV) sensors, spin-dependent tunneling (SDT) sensors, giant magnetoresistive (GMR) sensors and colossal magnetoresistive (CMR) sensors.

A second layer of nonmagnetic, electrically insulating material has been formed between the MR sensor and a second soft magnetic shield layer, which also serves as a first pole layer 46 in this example of a merged head. The first and second layers of nonmagnetic, electrically insulating material are indicated together as region 40. The MR sensor 44 may be electrically connected to the shield layers 30 and 46 in some embodiments, such as spin-dependent tunneling sensors.

A first electrically conductive coil layer 52 has first coil sections 55 that are separated from the first pole layer 46 by additional nonmagnetic, electrically insulating material 45. A second electrically conductive coil layer 57 has second coil sections 59 that are separated from the first coil sections 55 by material 45, but may be connected to first coil layer 52 in an interconnect not shown in this cross-section. For example, first coil layer 52 may spiral in a clockwise direction and second coil layer 57 may spiral in a counterclockwise direction with the center sections of the coils interconnected, so that current in coil sections 55 is parallel to current in coil sections 59. Second coil sections 59 are isolated from a second soft magnetic pole layer 60, the second pole layer coupled to the first pole layer 46 by a soft magnetic stud 62. Additional coil layers may also be formed. A protective coating 80 is formed on a trailing edge 82 of the body, while another protective coating 88 is formed on the media-facing surface 33.

Although the above-described magnetic head has been successfully employed, several issues remain. The fabrication of the dual coil layers can be complicated and time consuming. The photoresist that remains between the coil sections has a greater coefficient of thermal expansion than surrounding materials, and tends to enlarge due to resistive heating by the coils, which can cause pole tip protrusion. Also, the leading pedestal can sometimes magnetize the media to the sides of the desired track.

SUMMARY

A magnetic head for writing information on a relatively-moving medium is disclosed that has a first substantially flat soft magnetic pole layer disposed in the head adjacent to the medium-facing surface and extending substantially perpendicular to the medium-facing surface; a second substantially flat soft magnetic pole layer disposed in the head adjacent to the medium-facing surface and oriented substantially parallel to the first pole layer, the second pole layer spaced greater than one micron from the first pole layer and magnetically coupled to the first pole layer in a backgap region that is removed from the medium-facing surface; a soft magnetic pedestal having a leading edge and a trailing edge, the trailing edge adjoining the second pole layer adjacent to the medium-facing surface, the leading edge defining a throat area that is spaced from the first pole layer by a submicron nonferromagnetic gap and defining an apex area that is spaced from the first pole layer by a greater separation than the gap, the throat area meeting the apex area at a throat height; and a plurality of substantially parallel, electrically conductive sections disposed between the first and second pole layers, the conductive sections disposed in a single layer that is aligned along a plane that intersects the pedestal and the backgap region.

In one embodiment, a coil encircles the second pole layer, the coil including a plurality of substantially parallel, electrically conductive sections disposed in a layer that is located between the first and second pole layers, each of the conductive sections having a length measured in a direction that is substantially parallel to the medium-facing surface, wherein the length of at least two of the conductive sections is different.

DETAILED DESCRIPTION OF THE PREFERRED EMBODIMENT

Figure 2:
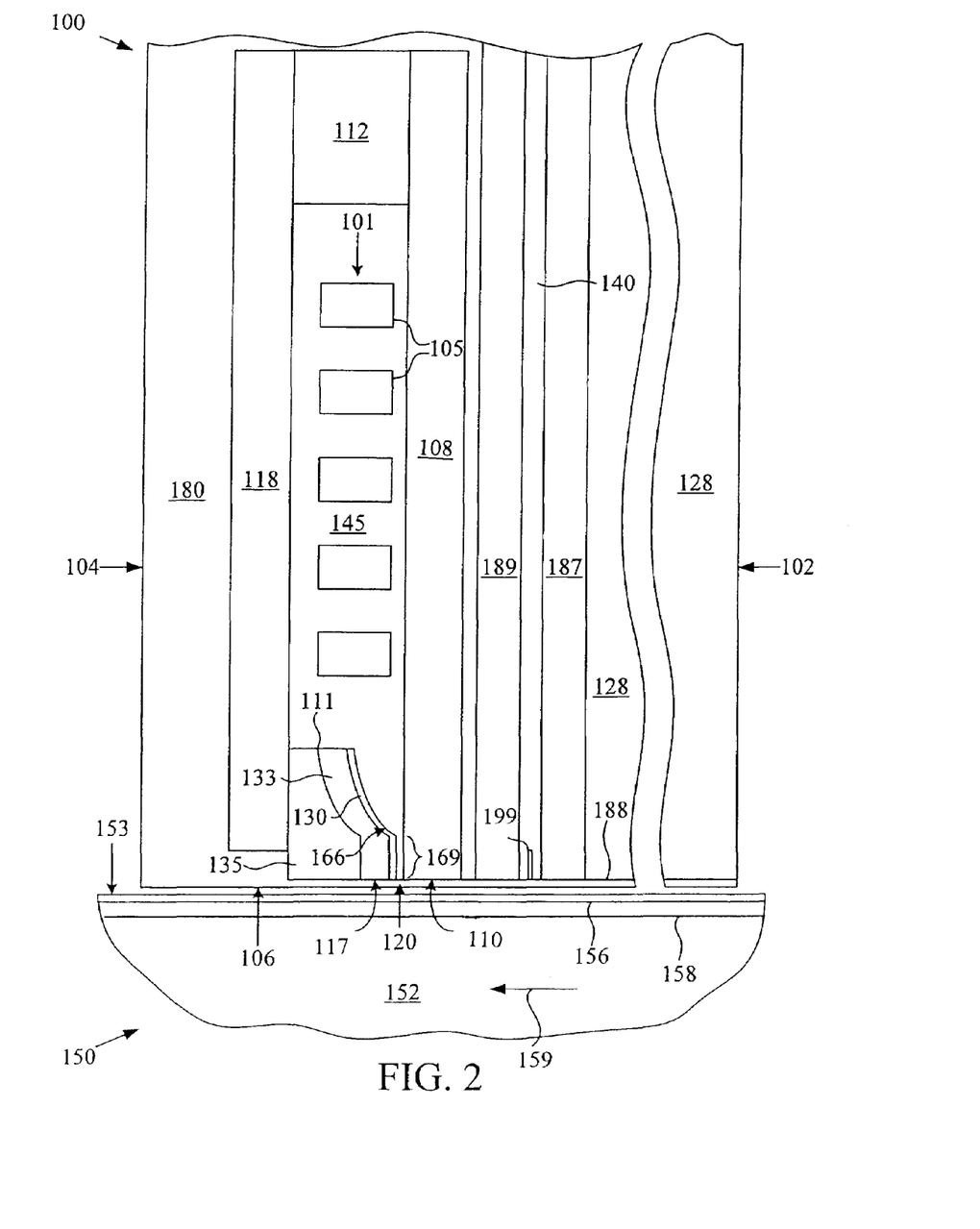
FIG. 2 is a cutaway cross-sectional view of another magnetic head in proximity to a relatively moving medium, the head including a trailing pedestal with a high magnetic saturation layer adjoining a write gap and defining a throat height.

FIG. 2 is a cutaway cross-sectional view of a magnetic head 100 in proximity to a relatively moving medium 150. The medium 150 includes a substrate 152 over which a seed or texture layer may have optionally been formed, followed by a media layer 158. The media layer 158 may have an easy axis of magnetization that is substantially parallel to a major surface 153 of the medium. Although depicted as a single layer, media layer 158 may be formed of a plurality of layers. A thin, physically hard overcoat 156 separates the media layer 158 from the medium surface 153. The medium 150, which may for example be a rigid disk, is moving relative to the head in a direction shown by arrow 159. The head 100 may be spaced from the medium 150 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

The head 100 has a leading end 102, a trailing end 104 and a medium-facing surface 106. A first substantially flat pole layer 108 is disposed in the head and terminates adjacent to the medium-facing surface in a substantially flat surface that forms part of a first pole tip 110. Layer 108 is preferably made of low coercivity, high permeability material, which is sometimes called soft magnetic material. A second substantially flat soft magnetic pole layer 118 adjoins a soft magnetic pedestal 111 that terminates adjacent to the medium-facing surface 106 in a second pole tip 117. Pedestal 111 includes high magnetic moment layers 130 and 133, as well as an electroplated portion 135. The second pole layer 118 is magnetically coupled to the first pole layer 108 by a soft magnetic backgap structure 112 in a core region that is removed from the medium-facing surface 106.

Adjacent to the medium-facing surface 106 the soft magnetic pedestal 111 is separated from the first pole layer 108 by a nanoscale nonferromagnetic gap 120. The soft magnetic elements 108, 112, 118, and 135 of the head 100 may have a permeability of at least about eight hundred, while layers 130 and 133 may also be formed of a high magnetic moment material, e.g., having a magnetic saturation of at least twenty kiloGauss. A throat height 169 has been defined by depositing the pedestal 111 on an inorganic dielectric apex 166, the pedestal-defined throat height providing flexibility in other dimensions, such as a flare point of the second soft magnetic layer 118. The pedestal 111 can be trimmed by a highly anisotropic removal process such as ion beam etching (IBE) to a desired track width. Such etching can remove part of first pole layer 108 that is not masked by the pedestal, aligning the first and second pole tips at a submicron track width.

A single electrically conductive coil layer 101 spirals around the backgap structure 112 and includes a plurality of coil sections 105 that are disposed between the soft magnetic layers 108 and 118 and between the pedestal 111 and the backgap structure 112. A current flowing in coil sections 105 induces magnetic flux in the magnetic elements 108, 112, 118, and 135, which fringes out from the pole tips 110 and 117 adjacent to the gap 120 to write a magnetic pattern on the media layer 158. The single coil layer 101 allows regions between the coil sections 105 to be filled with inorganic dielectric material 145 such as alumina after photoresist that was used to fabricate the coil layer 101 has been removed. The inorganic dielectric material 145 has a coefficient of thermal expansion that is less than photoresist, so that pole tip protrusion that may otherwise occur due to heat from the coil sections is reduced. The single coil layer 101 also reduces fabrication time of the head by about thirty-percent, lowering costs and time to market. Forming the coil sections 105 from the same material as the backgap structure 112, e.g., nickel-iron can further reduce fabrication time. The dielectric material 145 can be polished to form a flat surface with pedestal 135 exposed, upon which second pole layer 118 can be formed. A protective layer 180 can then be formed atop the second pole layer 118, the layer 180 forming the trailing end 104 after the head 100 has been separated from other heads formed on the wafer substrate 128.

The head 100 also includes a magnetoresistive (MR) sensor 199 sandwiched between first and second soft magnetic shield layers 187 and 189. The MR sensor 199 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Other magnetic sensors, such as optical sensors, can alternatively be employed to sense magnetic fields from the medium. A non-magnetic, electrically insulating material 140 is disposed between shields 187 and 189 and around sensor 199. A thin hard coating 188 formed for example of diamond-like carbon (DLC), silicon carbide (SiC), tetrahedral amorphous carbon (ta-C) or the like protects the MR sensor 199 from corrosion or other damage, the coating forming at least part of the medium-facing surface 106.

The MR sensor 199 is disposed adjacent to a substrate 128 on which the aforementioned thin film layers of the head 100 have been formed. The substrate 128 may extend much further between the first shield 187 and the leading end 102 than the distance between the first shield and the trailing end 104, and may be formed of any appropriate substrate material known in the art of magnetic heads, such as alumina, silicon, alumina-titanium-carbide, ferrite, etc.

Figure 3:
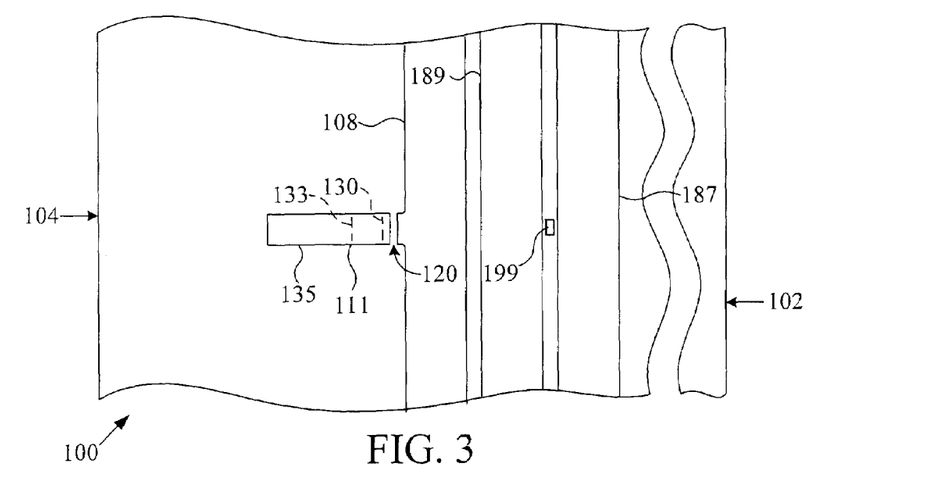
FIG. 3 is a cutaway view of the head of FIG. 2 as seen from the medium.

FIG. 3 is a cutaway view of the head 100 of FIG. 2 as seen from the medium, looking through the thin transparent coating 188 of the medium-facing surface 106, which is therefore not evident in this figure. In this embodiment, pedestal 111 layers 135, 133 and 130 have been trimmed for example by ion beam etching (IBE), aligning those layers with a an untrimmed portion of first pole layer 108 and defining the track width of nonferromagnetic gap 120. Second pole layer 118 does not extend as close to the medium facing surface and so is not shown in this figure. The narrow track width of electroplated section 135 may saturate with magnetic flux during recording, allowing high moment layer 130 to write a sharp pattern, and reducing side writing by pole layer 108. Pole layer 108 may optionally have a high moment material adjoining gap 120, with the remainder of that high moment material removed during IBE trimming of the pedestal 111. Pole layer 108 may measure on the order of one micron in a track-length dimension that is aligned between the leading end 102 and trailing end 104, and may extend many microns in the track-width dimension, aside from the portion that is trimmed along pedestal 111. Pedestal 111 may extend between two and four microns in the track-length dimension, and may extend between one-quarter and one micron in the track-width dimension.

Figure 4:
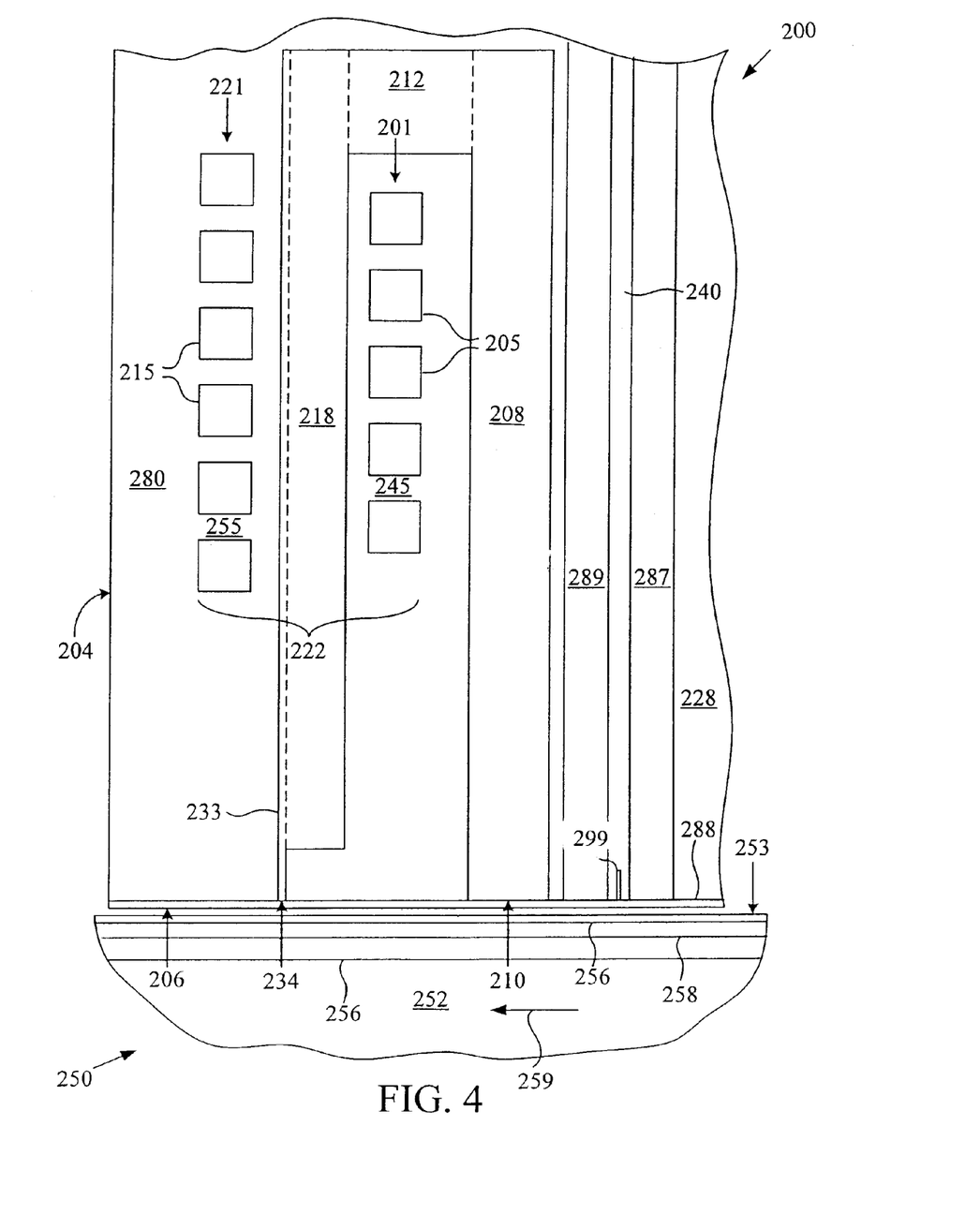
FIG. 4 is a cutaway cross-sectional view of another head in proximity to the moving medium, the head including a write pole layer encircled by a solenoidal coil.

FIG. 4 is a cutaway cross-sectional view of a magnetic head 200 and medium 250 that are similar to that shown in FIG. 2, but the head of FIG. 4 has a solenoidal coil 222 that encircles a second pole layer 218, and a third pole layer 233 for transmitting perpendicular signals to the medium 250. In this embodiment, each coil section 205 in a first coil layer 201 is connected to another coil section 215 in a second coil layer 221.

The medium 250 includes a substrate 252 over which a soft magnetic underlayer 254 has been formed, followed by a media layer 258. The media layer 158 may have an easy axis of magnetization that is substantially parallel to a major surface 253 of the medium. Although depicted as a single layer, media layer 258 may be formed of a plurality of layers. A thin, physically hard overcoat 256 separates the media layer 258 from the medium surface 253. The medium 250, which may for example be a rigid disk, is moving relative to the head in a direction shown by arrow 259. The head 200 may be spaced from the medium 250 by a nanoscale air bearing, or the head may be in frequent or continuous contact with the medium during operation.

The head 200 has a leading end, which is located off the page to the right, a trailing end 204 and a medium-facing surface 206. A first substantially flat soft magnetic pole layer 208 is disposed in the head and terminates adjacent to the medium-facing surface in a substantially flat surface that forms a first pole tip 210. A second substantially flat soft magnetic pole layer 218 is magnetically coupled to the first pole layer 108 by a soft magnetic backgap structure 212 in a core region that is removed from the medium-facing surface 206. The third pole layer 233 is substantially flat and includes high magnetic saturation, soft magnetic material that is magnetically coupled to the second pole layer 21.8. The third pole layer is located closer than the second pole layer 218 to both the trailing end 204 and the medium-facing surface 206.

Figure 5:
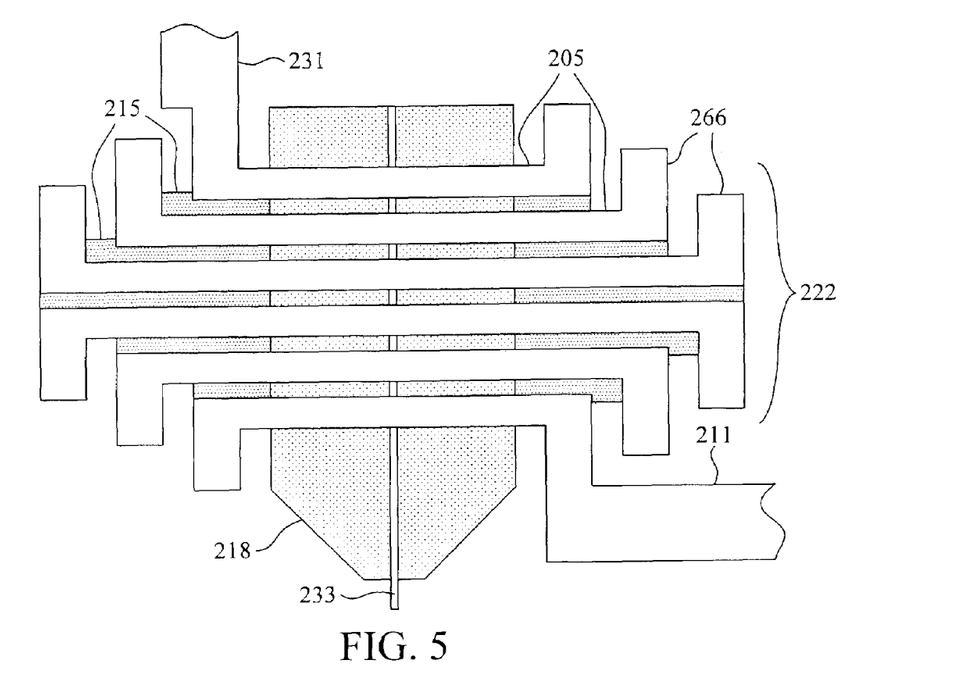
FIG. 5 is a view of the head of FIG. 4 as would be seen looking at the trailing end and focusing on the active elements of the write transducer.

The electrically conductive coil 222 winds around the second pole layer 218 and third pole layer 233 as shown in FIG. 5, which is a view of the head 200 as would be seen looking at the trailing end 64 and focusing on some of the active elements of the write transducer. Leads 211 and 231 extend off the page to connect with bond pads that are located on the trailing or top surface of the head to receive signal from drive electronics. Conductive sections 205 and 215 extend different amounts in a track-width direction that is parallel to the medium-facing surface. The conductive sections 205 are disposed in a layer and have an end portion 266 that extends within the layer transversely to the remainder of that section, and the conductive sections 215 have a similar transversely extending end portion, not shown in this figure. The transversely extending end portions afford greater areas for interconnection between the conductive sections 205 and 215, and the differing lengths of the conductive sections 205 and 215 provide room for the end portions.

Current flowing into lead 211 and out of lead 231 flows right-to-left in coil sections 205 and left-to-right in coil sections 215, inducing magnetic flux to flow downward in pole layers 218 and 233 to write an image of pole tip 234 on media layer 258. Current flowing into lead 231 and out of lead 211 flows left-to-right in coil sections 205 and right-to-left in coil sections 215, inducing magnetic flux to flow upward in pole layers 218 and 233 and write an oppositely magnetized image of pole tip 234 on media layer 258. The single coil layer 201 allows regions between the coil sections 205 to be filled with inorganic dielectric material 245 such as alumina after photoresist that was used to fabricate the coil layer 201 has been removed. Similarly, single coil layer 221 allows regions between the coil sections 215 to be filled with inorganic dielectric material 255 such as alumina after photoresist that was used to fabricate the coil layer 221 has been removed. Instead of a plurality of coil sections 215 a single coil section, which may be shaped as a layer, can be disposed between the pole layers 208 and 218, the coil section forming part of a coil that partially encircles the second pole layer 218. A protective layer 280 can be formed atop the coil layer 221, the layer 280 forming the trailing end 204 after the head 200 has been separated from other heads formed on the wafer substrate 228.

The head 200 also includes a magnetoresistive (MR) sensor 299 sandwiched between first and second soft magnetic shield layers 287 and 289. The MR sensor 299 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Other magnetic sensors, such as optical sensors, can alternatively be employed to sense magnetic fields from the medium. A non-magnetic, electrically insulating material 240 is disposed between shields 287 and 289 and around sensor 299. A thin hard coating 288 formed for example of diamond-like carbon (DLC), silicon carbide (SiC), tetrahedral amorphous carbon (ta-C) or the like protects the MR sensor 299 from corrosion or other damage, the coating forming at least part of the medium-facing surface 206.

The MR sensor 299 is disposed adjacent to a substrate 228 on which the aforementioned thin film layers of the head 200 have been formed. The substrate 228 may extend much further between the first shield 287 and the leading end 202 than the distance between the first shield and the trailing end 204, and may be formed of any appropriate substrate material known in the art of magnetic heads, such as alumina, silicon, alumina-titanium-carbide, ferrite, etc.

Figure 6:
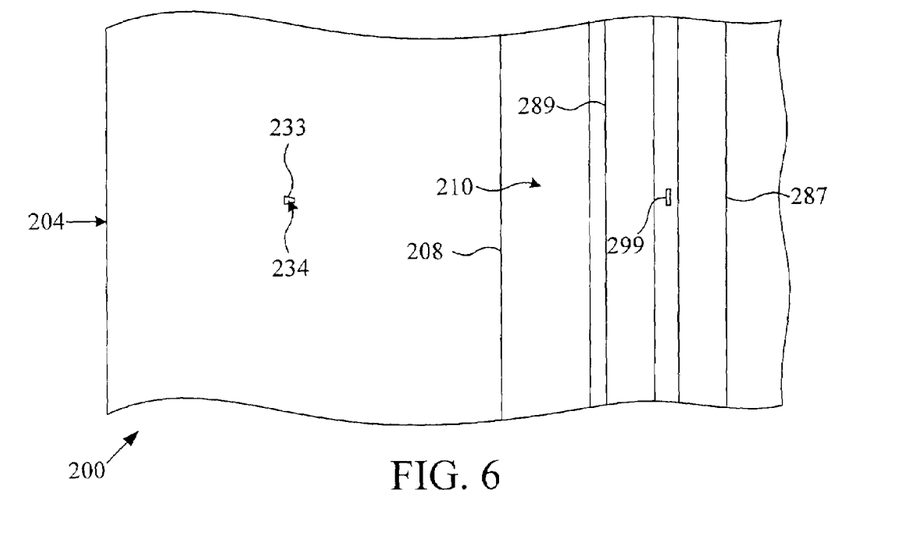
FIG. 6 is a cutaway view of the head of FIG. 4 as seen from the medium.

FIG. 6 is a cutaway view of the head 60 of FIG. 4 as seen from the medium, looking through the thin transparent coating 288 of the medium-facing surface 206, which are therefore not evident in this figure. In this embodiment, the dramatically different size of the write pole tip 234 compared to the return pole tip 210 is apparent. The write pole tip 234 may be trapezoidal in shape, with a track-width dimension along its trailing corner of approximately 0.15 micron (150 nanometers) or less, and a track-width dimension of approximately 0.25 micron (250 nanometers) or less. The medium-facing area of write pole tip 234 is therefore less than 0.04 square microns (40,000 square nanometers). Return pole tip 210 may measure on the order of 1.0 micron in the track-length dimension, and may extend 10 to 100 microns in the track-width dimension, large enough that its full width is not shown in this cutaway drawing. The medium-facing area of return pole tip 210 is therefore at least two orders of magnitude greater than that of the write pole tip 234.

We claim:

1. A magnetic head for writing information on a relatively-moving medium, the head having a leading end, a trailing end and a medium-facing surface, the head comprising:

a first substantially flat soft magnetic pole layer disposed in the head adjacent to the medium-facing surface and extending substantially perpendicular to the medium-facing surface, wherein a portion of the first magnetic pole layer adjacent to the medium-facing surface has a first medium-facing area substantially at the medium-facing surface;

a second substantially flat soft magnetic pole layer disposed between the first pole layer and the trailing end, oriented substantially parallel to the first pole layer, spaced greater than one micron from the first pole layer and magnetically coupled to the first pole layer in a backgap region that is removed from the medium-facing surface, wherein the second pole layer is recessed from the medium-facing surface;

a third pole layer extending substantially perpendicular to the medium-facing surface, the third pole layer residing between the second pole layer and the trailing end and being magnetically coupled with the second pole layer, a portion of the third pole layer disposed adjacent to the medium-facing surface, the portion having a second medium-facing area, wherein the first medium-facing area is at least two orders of magnitude greater than the second medium-facing area; and an electrically conductive coil that encircles the second pole layer, the coil including a plurality of substantially parallel, electrically conductive sections disposed in a coil layer that is located between the first and second pole layers, each of the conductive sections having a portion substantially parallel to the medium-facing surface, the portion having a length measured in a direction that is substantially parallel to the medium-facing surface, wherein the length of at least two of the portions of the conductive sections is different.

2. The head of claim 1, wherein the conductive sections each have an end portion disposed in the coil layer and extending transversely to the remainder of that section.

3. The head of claim 2, wherein at least one of the end portions extends substantially perpendicular to the medium-facing surface.

4. The head of claim 2, wherein at least one of the end portions provides a connection to a portion of the coil that extends between the second pole layer and the trailing end.

5. The head of claim 1, further comprising a soft magnetic pedestal disposed adjacent to the medium-facing surface between the first and second pole layers, the pedestal adjoining one of the pole layers and spaced from the other pole layer by a submicron nonferromagnetic gap.

6. The head of claim 5, wherein the pedestal has a leading edge and a trailing edge, the trailing edge adjoining the second pole layer adjacent to the medium-facing surface, the leading edge defining a throat area that is spaced from the first pole layer by the gap and defining an apex area that is spaced from the first pole layer by a greater separation than the gap, the throat area meeting the apex area at a throat height.

7. The magnetic head of claim 1 wherein the electrically conductive coil further includes an additional plurality of conductive sections disposed between the second pole layer and the trailing end, each of the additional plurality of coil sections having a portion extending substantially parallel to the medium-facing surface, the portion of the additional plurality of conductive sections having an additional length measured in the direction substantially parallel to the medium-facing surface, wherein the additional length of at least two of the additional plurality of conductive sections is different.

8. The magnetic head of claim 7 wherein the portion of each of the plurality of conductive sections extends substantially across the entire conductive section and the portion of each of the additional plurality of conductive sections extend substantially across the entirety of each of the additional plurality of conductive sections.

* * * * *